(No Model.)  3 Sheets—Sheet 1.
G. W. BROWN.
CULTIVATOR.
No. 354,388.  Patented Dec. 14, 1886.
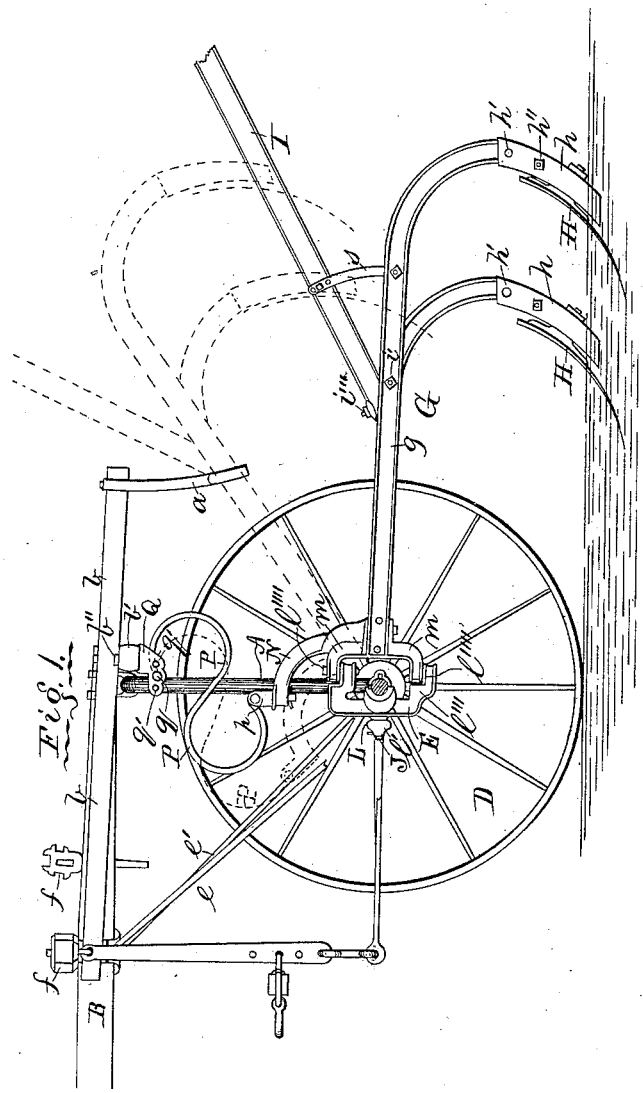
Witnesses:
C. R. Richards,
Thomas Young
Inventor:
Geo. W. Brown,
By W. B. Richards,
Atty.

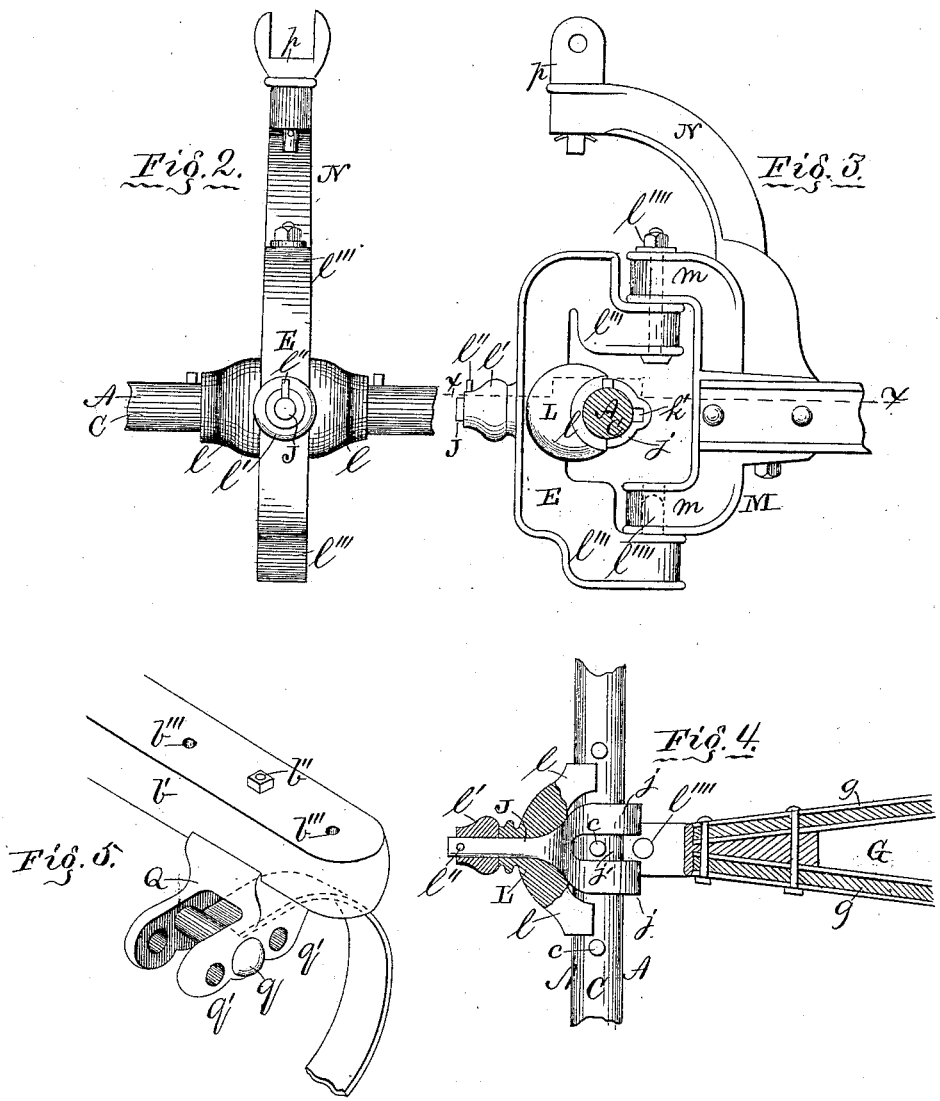

(No Model.) 3 Sheets—Sheet 3.
G. W. BROWN.
CULTIVATOR.
No. 354,388. Patented Dec. 14, 1886.
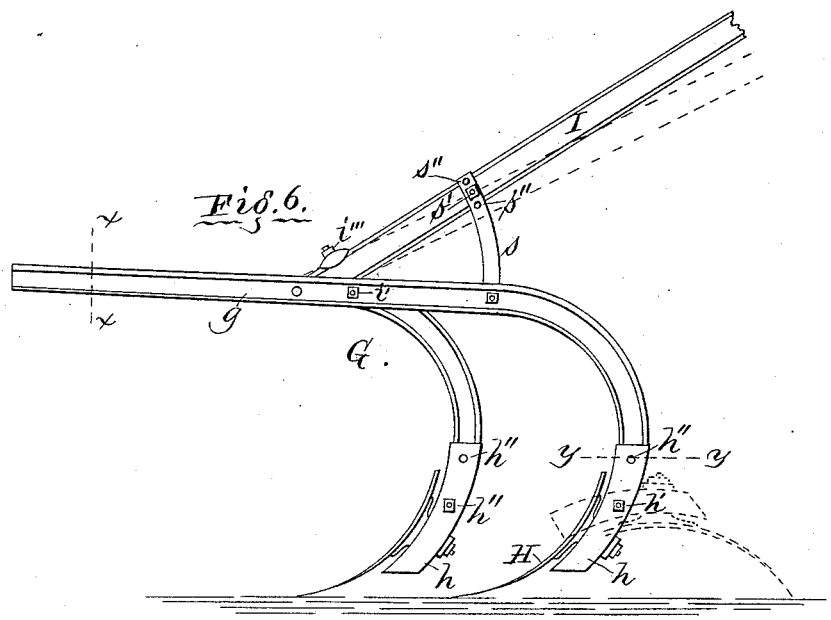
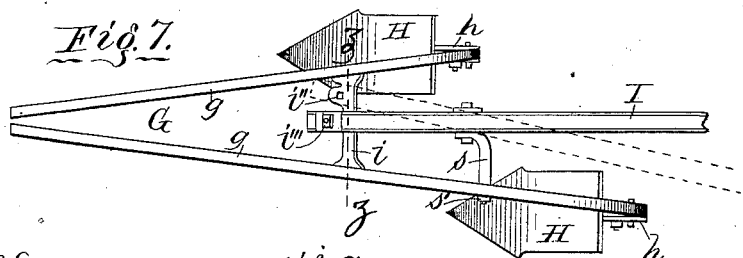
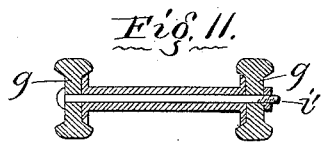
Witnesses:
S. R. Richards.
Thomas Young
Inventor:
Geo. W. Brown,
By W. P. Richards,
Atty.

UNITED STATES PATENT OFFICE.

GEORGE W. BROWN, OF GALESBURG, ILLINOIS.

CULTIVATOR.

SPECIFICATION forming part of Letters Patent No. 354,388, dated December 14, 1886.

Application filed November 13, 1885. Serial No. 182,723. (No model.)

*To all whom it may concern:*

Be it known that I, GEORGE W. BROWN, a citizen of the United States, residing at Galesburg, in the county of Knox and State of Illinois, have invented certain new and useful Improvements in Cultivators, of which the following is a specification.

This invention relates to improvements in cultivators; and it consists, first, in a new construction of lifting-spring and improved method of adapting it to the cultivator, whereby its lifting force is available in lifting the plow-gangs, but does not act while the plows are in operation in the soil, and which at the same time does not exert any lateral force on the plow-gangs when they are deflected to either side at their rear ends, and which springs can be adjusted to regulate the pressure downward at the forward end of the draft-pole, and also to entirely relieve said pressure when desired.

The invention further consists in improvements in the coupling of the plow-gangs to the axle, in the manner of adjustably fixing the handles to the gangs, and in the manner of staying the break-pin in plow-beams of the kind herein described.

In the accompanying drawings, which illustrate one method of applying my invention, Figure 1 is a side elevation of my invention and adjacent parts of a cultivator, partly in section; Fig. 2, a front elevation of the coupling; Fig. 3, a side elevation of the coupling, showing the axle in section; Fig. 4, a sectional plan of the coupling in the line $x\,x$ in Fig. 3; Fig. 5, a perspective of the upper end of the lifting-spring and its attachment to the cultivator; Fig. 6, a side elevation of one of the cultivator-gangs; Fig. 7, a top plan of the parts shown at Fig. 6; Fig. 8, a transverse section through one of the plow-beams; Fig. 9, a section in the line $y\,y$ in Fig. 6; Fig. 10, a top plan of the bar to which the forward end of the handle is adjustably secured; Fig. 11, a section in line $z\,z$ in Fig. 7.

Referring to the drawings by letters, the same reference-letter indicating the same part in the different figures, A is the axle, with elevated central part, to which is secured the tongue B, and with horizontal ends C, on which are journaled the wheels D, and also the couplings E between the wheels and the vertical part of the axle. The tongue is braced by lateral braces $b$, to which is secured in rear of the axle a transverse bar, $b'$. Braces $e\,e'$ from the tongue to the axle are shown partly broken away. Draft devices $f$ are also shown.

G is a plow-gang, formed of two plow-beams, $g$, each with a shovel, H, which is attached to a plate, $h$, U-shaped in its cross section, and the plates $h$ are secured to the plow-beams by a pivot-bolt, $h''$, and a wooden break-pin, $h'$. Each plow-gang has a handle, I.

The parts hereinbefore described by reference-letters are parts of an ordinary type of cultivator, and for the purposes of that part of my invention relating to the lifting-spring may be constructed and arranged as shown, or in any other manner which will admit of applying this feature of my improvements thereto.

J is an eyebolt, journaled at its eye $j$ on the part C of the axle. The eye $j$ has a slot, $j'$, which rests over one of the series of pins $c$ which project from the axle. In the rear side of the eye $j$ is a groove, $k'$, and by turning the bolt J until this groove coincides with one of the pins $c$ the eyebolt may be moved along the part C to adjust its position on said part for the purpose of adjusting the distance apart of the plow-gangs. The bolt J is held from lateral movement after adjustment by whichever pin $c$ is resting in the slot $j'$, while it (the bolt J) may turn freely on the axle to permit swinging the plow-gangs vertically.

L is one part of the coupling-joint. The side arms, $l$, of the plate L are fitted to the arm C of the axle, and the bolt J passes outwardly through the plate L, and has a washer, $l'$, and pin $l''$, by which the plate L is held, so that it may turn on the arm C with the bolt J. Arms $l'''$ project, one upwardly and one downwardly, and both in rear of the arm C, where they are journaled at $l''''$ to the ends $m$ of a forked beam-plate, M, which is rigidly secured to the forward end of a plow-gang. The plow-gangs swing laterally on the journals or pivots $l''''$.

N is a curved arm or bracket, rigidly secured at its lower end to the plow-gang in rear of the coupling, while its upper end is extended a short distance forward of the arm C of the axle when the plow-gangs are in working positions, as shown at Fig. 1.

P is an S-shaped spring, its lower end pivoted in the forked upper end of a bolt, $p$, which is journaled in the upper end of the arm N. The upper end of the spring P rests between the jaws of a plate, Q, and may be adjusted forward and rearward in said plate Q, and is held after adjustment by a pivot bolt, $q$, which passes through either of a series of holes, $q'$, in the plate Q. The plates Q are fixed one to each outer end of the bar $b'$.

The spring P, as constructed and arranged relatively to the parts of the cultivator to which it is attached, will exert not only a forwardly-acting but also a downwardly-acting force on the forward end of the arm N, and as the plow-gang is raised from its horizontal position (shown by full lines at Fig. 1) the upper end of the arm N will be thrown still more forward of the arm C, whereby the S-shaped spring will act to a better advantage and exert a lifting force which increases as the rear end of the plow-gang is elevated until the gang reaches the height shown by dotted lines at same figure, at which height they are hung on the suspending-hooks $a$. The lifting force exerted by the spring S is very slight while the plows are in their working position. (Shown by full lines at Fig. 1.)

When the upper end of the spring is secured in the forward hole $q'$, the spring will tend to raise the forward end of the tongue while the plows are at work, and when adjusted in the middle hole, as shown at Figs. 1 and 5, the spring will also slightly raise the forward end of the tongue, and when adjusted in the rear one of the holes $q'$ there will be more of the power of the spring exerted in lifting the forward end of the tongue, and thus in all of said positions of adjustment the "neck-draft" on the draft-animals' necks, common when ordinary springs are used, while the plows are at work will be entirely removed, and the lifting force of the spring on the gang will be increased when the plows are in working position. The farther forward the spring is secured to the plate Q the less lifting force will it exert on the gangs when down in working positions, as in plowing, and as shown by full lines in Fig. 1.

The plate Q is adjustable lengthwise of the bar $b'$, and is held after adjustment by a bolt, $b''$, which passes through either of a series of holes, $b'''$, in the bar $b'$. Thus the spring may be adjusted laterally when the plow-gangs are adjusted laterally on the arm C to adjust their distance apart.

The beams $g$ are each formed of bars of steel formed in their cross-section as shown at Fig. 8—that is, with a flange projecting from both sides of the bar at both its upper and lower edges. It is desirable in iron or steel plow-beams to have them as light as possible with the proper stiffness and strength, and this form of beam I find, when made of steel, has a maximum of strength and stiffness with a minimum of weight.

The handles I are each secured at their forward ends to a bar, $i$, which extends from one plow-beam of a gang to the other beam of the same gang, and is held by a bolt, $i'$, which passes through the two plow-beams and lengthwise through the bar $i$. The ends of the bar are enlarged so that they fit snugly between the flanges on the sides of the plow-beams, and thus their fastenings to the beams are made more secure by the flanged beams. The bars $i$ have holes $i''$, through either of which a bolt, $i^3$, may be passed to secure the front end of the plow-handle thereto. The plow-handle is supported in rear by a brace, $s$, which is secured at its lower end to one of the plow-beams and at its upper portion to the handle by means of a bolt, $s'$, which passes through either of a series of holes, $s''$, in said brace. By adjusting the bolt $i^3$ in the different holes $i''$ the handles I may be adjusted laterally at their rear ends, as shown by dotted lines at Fig. 7, and by adjusting the bolt $s'$ in the holes $s''$ the height of the handle at its rear end may be adjusted, as shown by dotted lines at Fig. 6.

To prevent the wooden break-pin $h''$ breaking too easily by reason of the distance from the web of the plow-beam (through which web the break-pin passes) to the adjacent sides of the plate $h$, I fix bosses $h'''$ to the web of the plow-beam, one on each side of the beam and extending from the beam outward to the plate $h$. The break-pin passes through the bosses $h'''$, (see Fig. 9,) and being rigidly secured to the plow-beam, these bosses protect the break-pin and prevent it breaking too easily, as would be the case if the bosses were not used. The bosses may be secured to the beam by welding, riveting, or in any desired or preferred method or manner.

Having thus described my invention, what I claim as new, and desire to secure by Letters Patent, is—

1. In a cultivator-coupling, the combination, with the plate L, fitted to the axle-arm C and provided with arms $l'''$, and the forked beam-plate M, journaled to the arms $l'''$, of the eye-bolt J, having a slot, $j'$, and groove $k'$, and arm C, provided with stud or pins $c$, substantially as and for the purpose specified.

2. In a cultivator, in combination with an axle and a plow-gang hinged or coupled thereto, having an arm, N, connected to said plow-gang in rear of the coupling and extending forward of the axis on which the plow-gang swings vertically, an S-shaped spring connected at one end to the forward end of the arm N and at its other end to a plate secured to the upper part of the axle or cultivator-truck, substantially as and for the purpose specified.

3. In a cultivator, in combination with an axle and a plow-gang coupled or hinged thereto, having an arm, N, connected to said plow-gang in rear of the coupling and extending forward of the axis on which the plow-gang swings vertically, an S-shaped spring connected at one end to the forward end of the arm N, and its other end adjustably secured to a plate, Q, which is fixed to the upper part of the axle or truck frame, substantially as and for the purpose specified.

4. In a cultivator, in combination with an axle and a plow-gang coupled or hinged thereto, having an arm, N, connected to said plow-gang in rear of the coupling and extending forward of the axis on which the plow-gang swings vertically, an S-shaped spring connected at one end by a pivotal bolt, $p$, to the forward end of the arm N, and its other end adjustably secured to a plate, Q, which is fixed to the upper part of the axle or truck frame, substantially as and for the purpose specified.

5. In a cultivator, in combination with the plow-gang formed of two plow-beams, as described, brace-bar $i$, having holes $i''$, and handles I, adjustable laterally thereon, the brace $s$, fixed at one end to a plow-beam and its other end provided with holes $s''$, by means of which and a bolt, $s'$, the handle can be adjusted vertically, substantially as and for the purpose specified.

6. The combination, with a cultivator plow-beam constructed of steel bars with double flanges, and a shovel connected to a swinging plate hinged to the plow-beam, and a wooden break-pin, of bosses secured to the web of the plow-beam, surrounding the break-pin, and extending to the swinging plate, substantially as and for the purpose specified.

In testimony whereof I affix my signature in presence of two witnesses.

GEORGE W. BROWN.

Witnesses:
I. S. PERKINS,
M. T. PERRIN.